United States Patent [19]
Zappel

[11] 3,926,128
[45] Dec. 16, 1975

[54] RAILWAY CAR SHUNTING LOCOMOTIVE

[76] Inventor: Werner Zappel, Muehlstrasse 13-15, D-6921, Grombach, Germany

[22] Filed: Sept. 24, 1973

[21] Appl. No.: 399,962

[30] Foreign Application Priority Data
Oct. 18, 1972 Germany.............................. 2251093
Aug. 16, 1973 Germany.............................. 2341491

[52] U.S. Cl............. 105/26 R; 105/26 D; 105/90 A; 105/101; 105/159; 105/215 R; 295/31
[51] Int. Cl.²...................... B60B 17/02; B61C 9/08; B61C 13/00; B61F 13/00
[58] Field of Search...... 105/27, 159, 215 R, 215 C, 105/26 R, 101, 90 A, 159, 26 D; 291/31

[56] References Cited
UNITED STATES PATENTS

| | | | |
|---|---|---|---|
| 881,008 | 3/1908 | Knut................................ | 105/159 X |
| 1,258,329 | 3/1918 | Foreman........................... | 105/27 |
| 1,536,864 | 5/1925 | Jones............................... | 105/159 X |
| 1,880,126 | 9/1932 | Fageol.............................. | 105/159 |
| 1,957,712 | 5/1934 | Gustafson.......................... | 105/159 |
| 2,171,093 | 8/1939 | Klima et al....................... | 105/215 C X |
| 3,086,483 | 4/1963 | Scheldrup........................... | 105/159 |
| 3,207,085 | 9/1965 | Burr.................................. | 105/26 R |

FOREIGN PATENTS OR APPLICATIONS

| | | | |
|---|---|---|---|
| 297,232 | 5/1957 | Switzerland....................... | 105/90 A |
| 310,567 | 5/1929 | United Kingdom................. | 105/159 |
| 899,319 | 12/1953 | Germany........................... | 105/90 A |

*Primary Examiner*—Robert S. Ward, Jr.
*Assistant Examiner*—Howard Beltran
*Attorney, Agent, or Firm*—Hill, Gross, Simpson, Van Santen, Steadman, Chiara & Simpson

[57] ABSTRACT

A shunting locomotive device especially useful for shunting freight-cars has running wheels along each longitudinal side adapted to run on railway tracks and supporting a platform to accommodate thereon a motor-driven driving vehicle having driving wheels, such as a fork-lift truck, the running wheels of the shunting device being in motion-transmitting connection by means of a speed reducer mechanism with at least one pair of rotatably mounted driving rollers at the top of the platform arranged on substantially parallel axes and spaced apart from each other and having generally upwardly facing traction surfaces defining a space which is narrower than the diameter of the driving wheels of the driving vehicle so that the driving wheels with their axes generally parallel with the driving rollers can rest thereon in driving relation, there being at least three, and preferably four, running wheels arranged one behind the other on each longitudinal side of the device, the treads of all running wheels having a covering of resilient friction material, such as rubber, plastic or the like, the running wheels being in motion-transmitting connection with the driving rollers, the foremost and rear-most running wheels on each side having a flange, and the running wheels between the foremost and rearmost running wheels at each side being flangeless.

7 Claims, 3 Drawing Figures

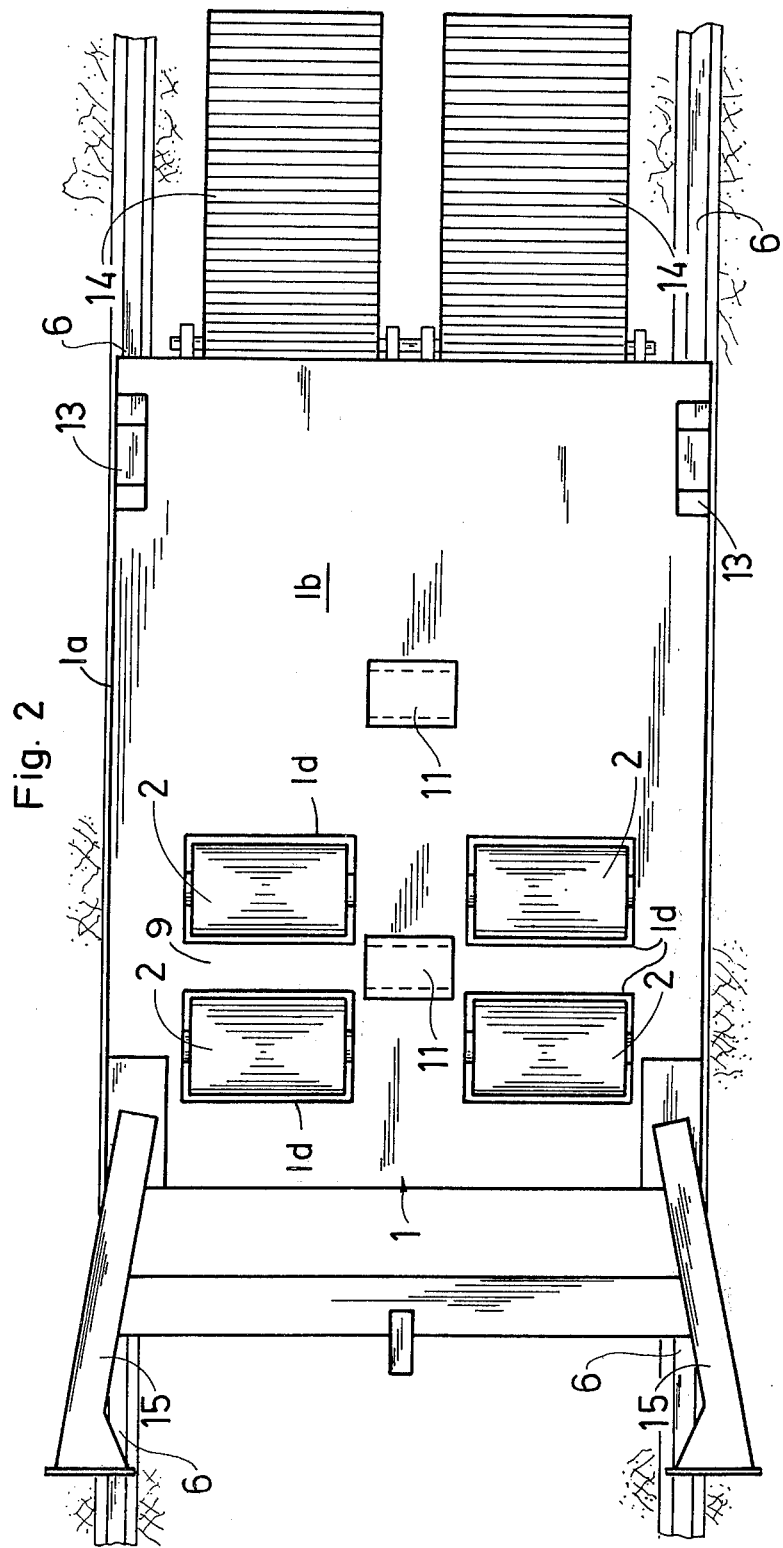

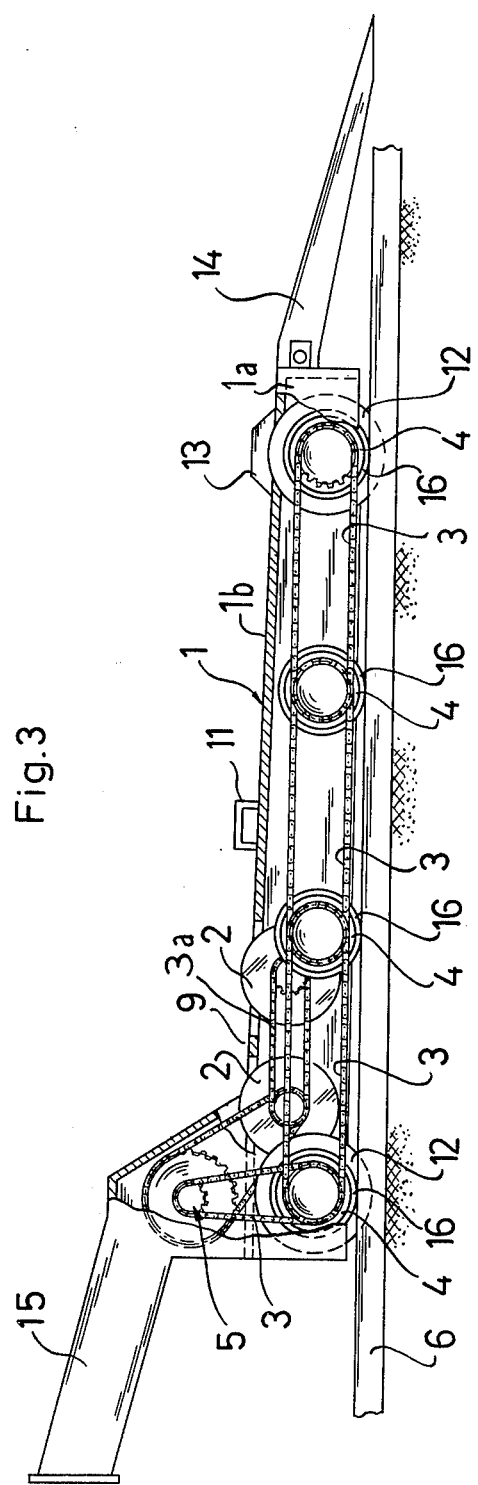

RAILWAY CAR SHUNTING LOCOMOTIVE

The invention relates to a shunting device, especially a freight-car shunting device, having running wheels preferably in the form of traction wheels and having a platform adapted to accommodate a motor-driven driving vehicle which does not run on tracks, for example a fork-lift truck, the traction wheels of the device being in motion-transmitting connection with at least one pair of rotatably mounted driving rollers arranged substantially parallel with, and spaced apart from each other, the outer driving surfaces of the driving rollers facing upwardly and extending above the plane of the platform, and running substantially parallel thereto, the driving rollers defining a space therebetween which is narrower than the diameter of the driving wheels of the driving vehicle, so that the driving wheels, having their axles approximately parallel to the driving rollers, can rest thereon. In a device of this kind, if the driving wheels of a driving vehicle thus driven onto the driving rollers are caused to rotate, i.e. are driven, they also drive the said driving rollers and thus the traction wheels of the shunting device, and the latter is set in motion in a direction corresponding to the direction of rotation of its traction wheels.

It is the purpose of the invention to improve the performance of a shunting device of this kind around curves. According to the invention this is achieved in that two pairs of driving rollers are provided, the rollers of one pair lying one behind the other coaxially with the rollers of the other pair, and one pair of the said rollers being in motion-transmitting connection with only the traction wheels located on one longitudinal side of the unit, while the other pair of rollers is in motion-transmitting connection with only the traction wheels located on the other longitudinal side of the unit. When the device is travelling around a curve, it is thus possible to make use of the differential of the vehicle which has been driven onto the platform of the shunting device, so that the latter requires no differential.

At least three traction wheels can be arranged on each side of the platform, the foremost and rearmost wheels each being provided with a flange, whereas the traction wheels therebetween have no flanges. The provision of at least three traction wheels on each longitudinal side of the device increases the driving power thereof by increasing the friction between wheels and track, the lack of flanges on the intermediate traction wheels eliminating any additional stressing of these wheels when the device is running around a curve, In order to increase the driving power of the device still further, the treads of all traction wheels may be provided with a covering of resilient friction material such as rubber, plastic, or the like. This also provides for better adaptation of the tread of the wheels to track irregularities, such as rail joints and gaps at switches and the like.

In order to make it as easy as possible to drive the driving vehicle onto the platform of the shunting device, the platform should be as close as possible to the ground. In one advantageous embodiment of the invention, this is achieved by allowing the flanges of the foremost and rearmost traction wheels on each side of the device to project through recesses in the platform or into upward projections thereon. Again in one preferred form of the invention, and for the same reason, the speed reducing mechanism between the driving rollers and the traction wheels is not arranged entirely under the platform, but may be either located completely above the platform to one side of it, or passes through an aperture in the platform, or into a projection thereon.

One embodiment of the shunting device according to the invention is described in greater detail hereinafter and is illustrated in the attached drawings, wherein:

FIG. 2 is a plan view of the device, with the driving ramps lowered, but without the driving vehicle; and FIG. 3 is a vertical section through the device shown in FIG. 2.

Figure 1:
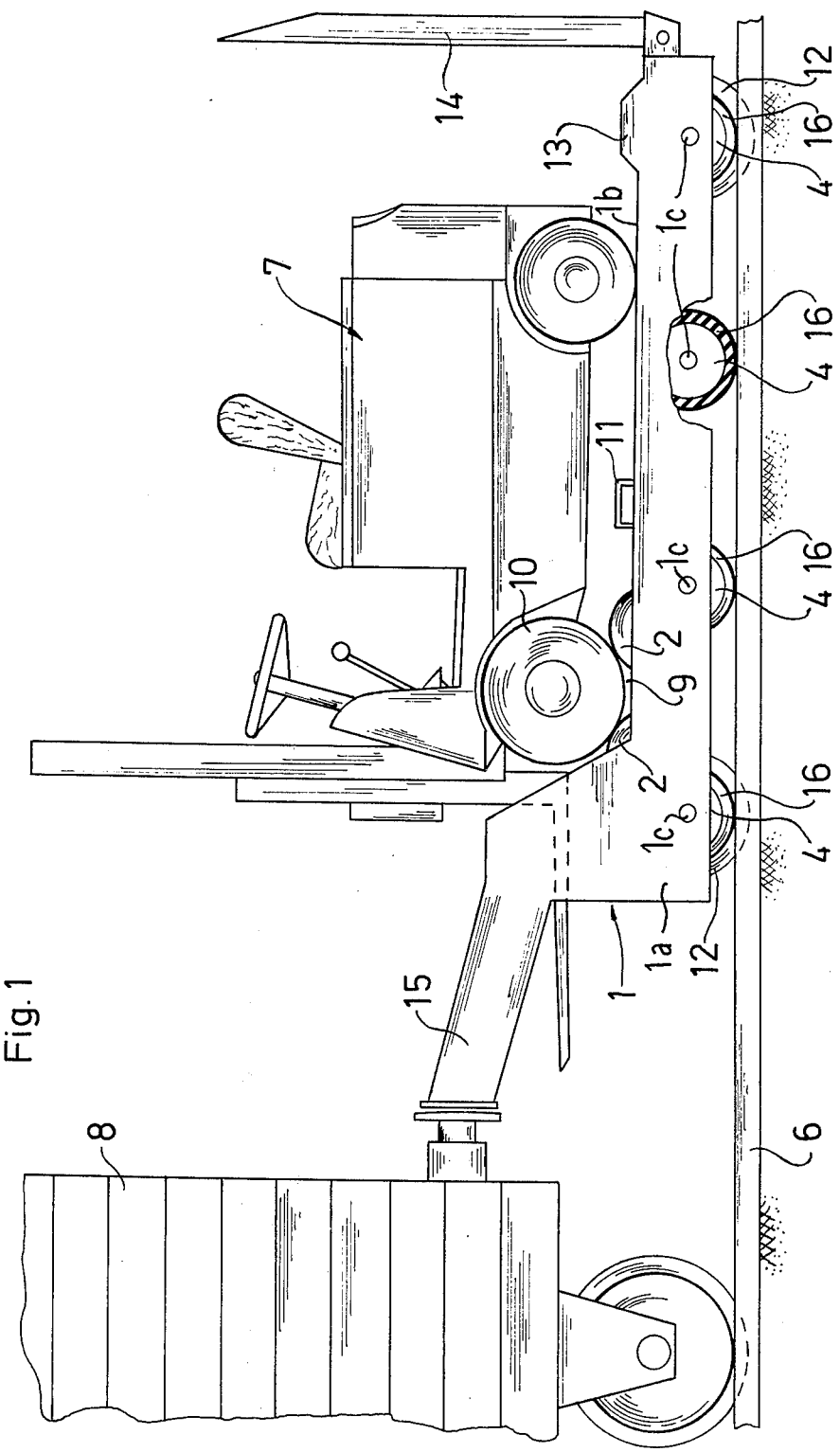
FIG. 1 is a side elevation of a shunting device according to the invention as used in conjunction with a driving vehicle driven up onto the platform.

Shunting device 1 illustrated in the drawings has a chassis 1a, the upper surface of which is in the form of a platform 1b, along each longitudinal of which there are provided four track running traction wheels 4, by means of which the shunting device can travel along tracks 6. The wheels 4 on each side of the shunting device 1 are mounted separately on the chassis 1a by means of stub-axles 1c.

The foremost and rearmost traction wheels on each side of the device have flanges 12, whereas the intermediate traction wheels have no flanges, and are therefore not subjected to additional stress when the device is travelling around a curve.

In order to avoid the height of the platform 1b from the ground being increased by the wheel flanges to provide a low profile and low center of gravity for the platform, the flanges on the rear wheels 4 are housed in upward projections 13 on the platform, whereas the flanges on the front wheels are accommodated in the lower portions of upwardly projecting hollow buffer brackets 15. Moreover, the platform 1b slopes slightly downwards towards its rear end, to make it as easy as possible to drive a motor driven vehicle 7 such as a fork-lift truck onto the platform.

In order to obtain the greatest possible amount of driving power, which is necessary if a large number of freight cars is to be shunted, the treads of all of the wheels 4 are provided with coverings 16 of friction material, for instance rubber or plastic. The material used should have the highest possible coefficient of friction.

The shunting device also has two pairs of driving rollers 2, one pair of which lies axially spaced behind the other pair (FIG. 2). The rollers are rotatably mounted on the shunting device by means located under the surface of the platform 1b, but with generally upwardly facing traction surfaces of the rollers project above the surface of the platform through apertures 1d therein, and defining therebetween a free space 9 which is narrower than the diameter of driving wheels 10 of the driving vehicle 7 to be driven up onto the platform (FIG. 3), so that the said driving wheels, having their axes approximately parallel to the axes of the driving rollers 2, can rest thereon.

Each pair of driving rollers 2 is coupled in motion-transmitting connection with the wheels 4 on only one longitudinal side of the shunting device 1, the shunting device therefore not requiring a differential gear for running around curves. In the embodiment illustrated in the drawings, each of the motion-transmitting connections is in the form of chain drives 3 (FIG. 3), by means of which all of the wheels 4 on each respective longitudinal side of the shunting device may be driven by the respective driving rollers 2. At each side these chain drives 3 are connected to chain drives 3a connecting the driving rollers 2 by means of an increasing or reducing transmission 5 housed in the corresponding one of the hollow buffer brackets 15 at the front end of the device. This increasing or reducing transmission 5 is designed in a manner such that the rpm of the running wheels 4 is considerably reduced in relation to that of driving rollers 2. This transmits a particularly high torque to the traction wheels 4, which provides the shunting device with unusually high thrust and traction which may be used to the full by the large number of traction wheels with their friction-increasing coverings 16. Shunting forces may be transferred to freight cars 8 by pushing through the buffers 15. On the other hand, if the freight car, or cars, is to be pulled by the shunting device 1, the latter may be coupled to the said freight car, or cars, in some appropriate manner.

In order to make it easier to drive the driving vehicle 7 up onto the platform 1b of the device 1 (which is made as low as possible and also slopes slightly towards its rear end) two folding driving ramps 14 are hinged, in the example illustrated in the drawing, to the rear end of the shunting device. With the device in the operative position shown in FIG. 1, the ramps 14 are folded upwards, so that they do not impede movement of the device along the tracks 6. In FIG. 3 of the drawing, the ramps 14 are shown lowered, to allow the driving vehicle 7 to be driven onto and off the platform 1b.

In the embodiment illustrated, two eyes 11, spaced apart from each other, are provided on the top of the platform 1b approximately along the centreline thereof and projecting upwardly therefrom. They are made of U-shaped sections and are far enough apart to allow the forks of the fork-lift truck 7, standing at the side of the shunting device 1, to be inserted into them. In this way, the entire shunting device 1 may be lifted by the fork-lift truck 7 and placed elsewhere.

I claim:

1. A shunting device especially useful for shunting freight cars, having traction wheels along each longitudinal side thereof adapted to run along railway tracks, and having a platform to accommodate thereon a motor-driven driving vehicle such as a fork-lift truck having driving wheels, there being at least one pair of rotatably mounted driving rollers at the top of said platform arranged on substantially parallel axes and spaced apart from each other and having generally upwardly facing traction surfaces defining therebetween a space which is narrower than the diameter of the driving wheels of the driving vehicle, so that said driving wheels with their axes generally parallel to said driving rollers can rest thereon in driving relation, the improvement comprising:

at least three traction wheels arranged one behind the other on each longitudinal side of the device;
the treads of all of the traction wheels having a covering of resilient friction material;
motion-transmitting connection means coupling said traction wheels and said driving rollers, so that rotary driving of said rollers by said driving wheels will effect running rotation of said traction wheels;
the foremost and rearmost traction wheels on each side of the device having a flange; and
the traction wheels intermediate said foremost and rearmost traction wheels at each side of the device being flangeless so as to facilitate negotiating curves in railway tracks.

2. A shunting device according to claim 1, wherein the motion-transmitting connection means comprise chain drives.

3. A shunting device according to claim 1, wherein the flanges on the foremost and rearmost traction wheels along each longitudinal side of the device extend into clearance means on the platform to provide a low profile and low center of gravity for the platform.

4. A shunting device according to claim 1, wherein two pairs of the driving rollers are provided, the rollers of one pair lying one behind the other and coaxially with the other pair, said motion-transmitting connection means coupling one pair of said rollers with only the traction wheels located on one longitudinal side of the device, and said motion-transmitting connection means coupling the other pair of rollers with only the traction wheels located on the other longitudinal side of the device.

5. A shunting device according to claim 1, comprising four traction wheels along each longitudinal side, including two flangeless wheels intermediate each of the foremost and rearmost traction wheels at each side.

6. A shunting device according to claim 1, wherein said resilient friction material comprises rubber material.

7. A shunting device according to claim 1, wherein said resilient friction material comprises plastic material.

* * * * *